United States Patent [19]
van der Lely et al.

[11] Patent Number: 4,641,491
[45] Date of Patent: Feb. 10, 1987

[54] AGRICULTURAL MACHINE

[75] Inventors: Edwin van der Lely, Maasland; Cornelis J. G. Bom, Rozenburg, both of Netherlands

[73] Assignee: C. van der Lely, N.V., Maasland, Netherlands

[21] Appl. No.: 708,639

[22] Filed: Mar. 6, 1985

[51] Int. Cl.⁴ ............................................. A01B 73/00
[52] U.S. Cl. ........................................ 56/228; 56/370; 172/447; 172/456; 172/605
[58] Field of Search ................ 56/16.3, 228, 366, 370, 56/372; 172/311, 446, 447, 456, 605; 280/415 R

[56] References Cited

U.S. PATENT DOCUMENTS 3,690,055  9/1972  Reber ..................... 56/370
3,841,073 10/1974  Van der Lely ......... 56/370
4,015,413  4/1977  Van der Plas et al. ... 56/370
4,175,369 11/1979  Gerlinger ................ 56/370
4,202,160  5/1980  Van der Lely ......... 56/370
4,245,457  1/1981  Gerlinger ................ 56/370
4,330,986  5/1982  Van der Lely et al. .. 56/370

FOREIGN PATENT DOCUMENTS 251949   5/1966  Fed. Rep. of Germany ........ 56/370
A4076/70 9/1973  Fed. Rep. of Germany .
158995   1/1979  Netherlands .
2077561 12/1981  United Kingdom ................ 56/370

Primary Examiner—Robert Peshock
Assistant Examiner—John G. Weiss
Attorney, Agent, or Firm—Penrose L. Albright

[57] ABSTRACT

A haymaking machine comprises a sub-assembly provided with two rake members, the sub-assembly being connected to a frame for pivotal movement about a pivotal axis that slopes upwardly to the rear. The center of gravity of the sub-assembly is ahead of such axis and a locking mechanism is provided for retaining the sub-assembly in a required working or transport position with respect to the frame. The disposition of the center of gravity and the pivotal axis is such that, when the locking mechanism is released, lifting machine above the ground causes the sub-assembly to swing automatically about the pivotal axis towards a transport position. If the machine is lifted more, the sub-assembly then swings automatically towards the working position.

37 Claims, 9 Drawing Figures

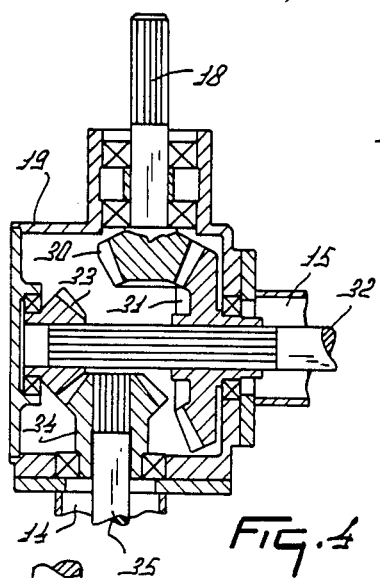
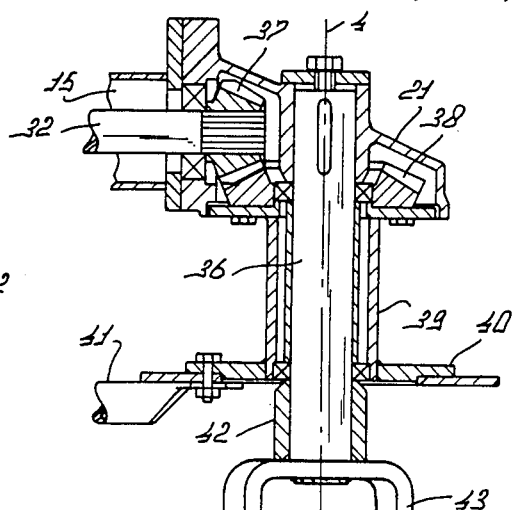
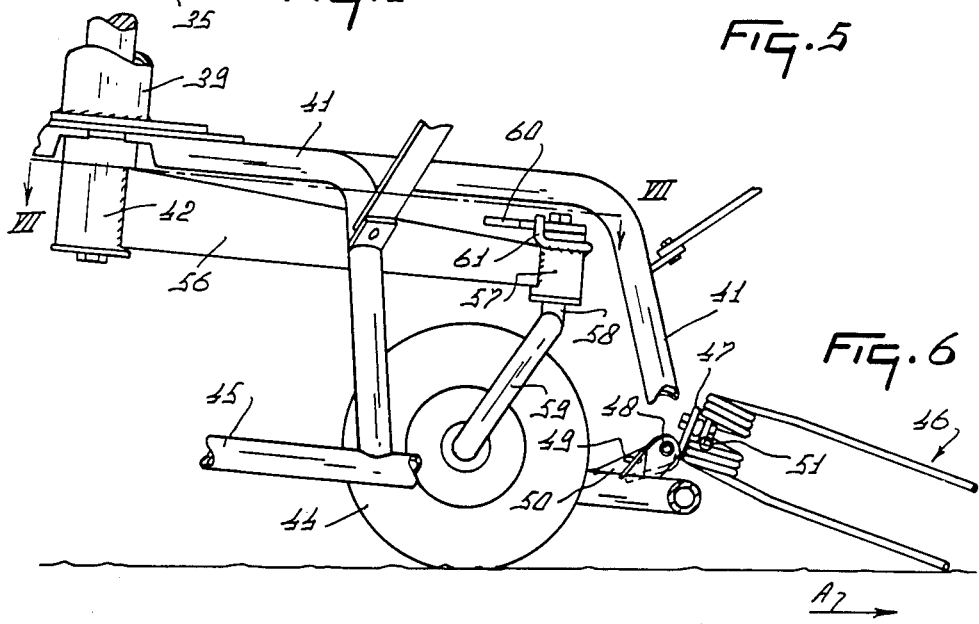
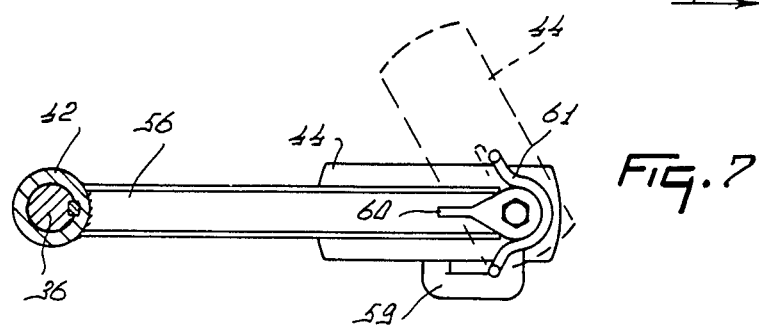

AGRICULTURAL MACHINE

FIELD OF THE INVENTION

This invention relates to an agricultural machine, and particularly, although not exclusively, to a hay-making machine.

BACKGROUND OF THE INVENTION AND PRIOR ART

It is known for a hay-making machine to comprise a frame, adapted to be connected to the three-point lifting device of a tractor, and a sub-assembly including a working member. The sub-assembly can be turned with respect to the frame about an upwardly directed pivotal axis between a working position and a transport position.

With known machines of this kind, in particular when they have been used for some time, the pivotal movement requires considerable effort, even when the machine is lifted from the ground.

SUMMARY OF THE INVENTION

According to the present invention there is provided an agricultural machine comprising:

a frame adapted for connection to a three-point lifting device of a tractor;

a sub-assembly comprising a working member of the machine; and connecting means connecting the sub-assembly to the frame for pivotal displacement, between a working position and a transport position, about an upwardly extending pivotal axis which, in the working position, is inclined to the rear, with respect to the intended direction of operative travel of the machine, from bottom to top, the center of gravity of the sub-assembly, when in the working position, being spaced from the pivotal axis.

BRIEF DESCRIPTION OF THE DRAWINGS

For a better understanding of the present invention and to show how it may be carried into effect, reference will now be made, by way of example, to the accompanying drawings, in which:

FIG. 3 is a sectional view taken on the line III—III in FIG. 1;

FIG. 4 is a sectional view taken on the line IV—IV in FIG. 2;

FIG. 5 is a sectional view taken on the lines V—V in FIG. 1;

FIG. 6 shows an alternative position of ground wheels of the machine as viewed in the direction of the arrow VI in FIG. 1;

FIG. 7 is a view taken on the line VII—VII in FIG. 6;

DETAILED DESCRIPTION OF THE PREFERRED EMBODIMENTS

Figure 1:
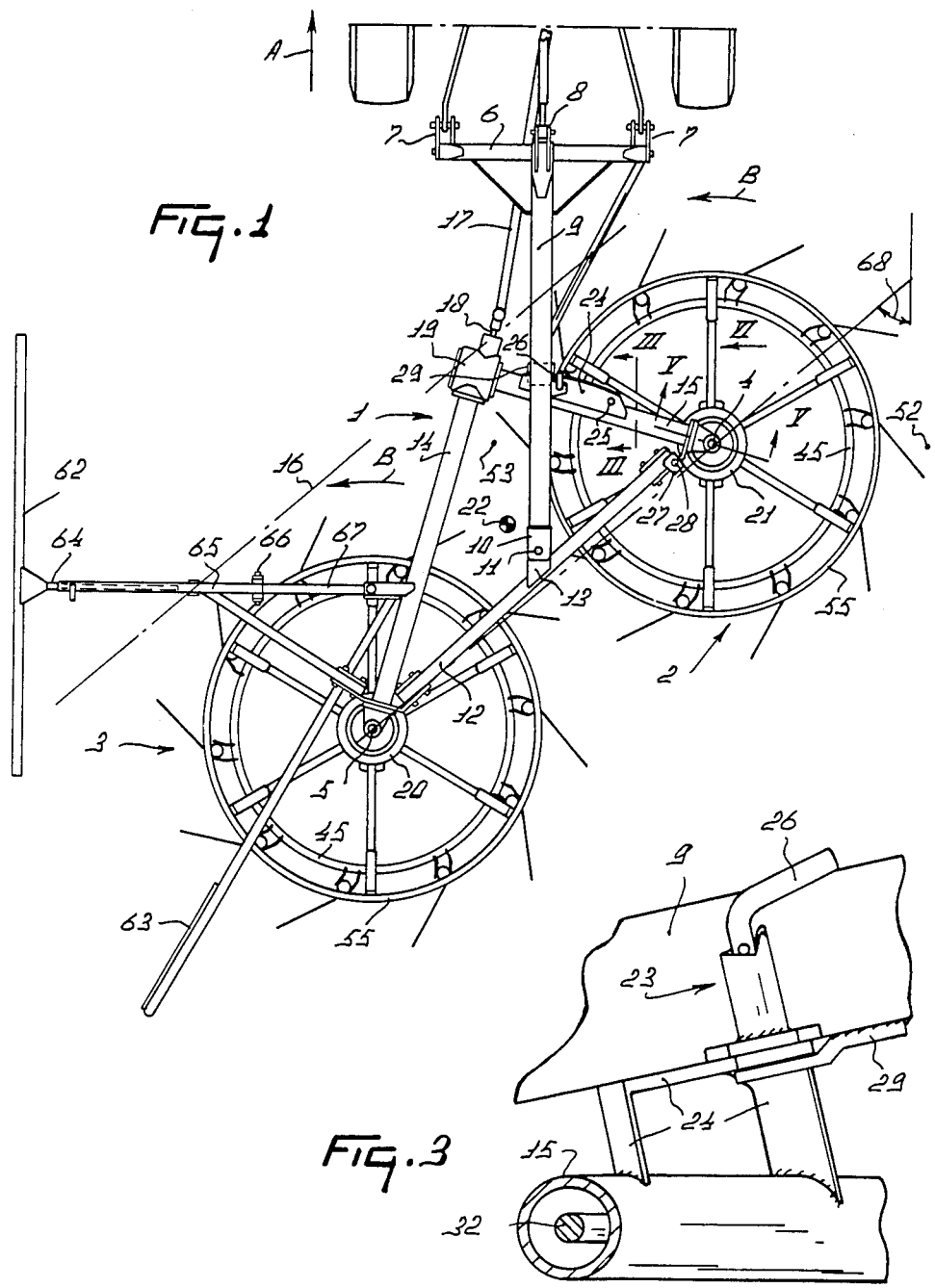
FIG. 1 is a plan view of a hay-making machine.

The haymaking machine shown in the Figures comprises a frame 1 carrying tined rake members 2 and 3. The machine is drawn, in operation, in the direction A and, in this embodiment, the rake members 2 and 3 are driven in the same directions of rotation B. The rake members 2 and 3 are driven from a tractor drawing the machine about upwardly directed rotary axes 4 and 5 respectively. Each of these rotary axes lies in a vertical plane parallel to the direction A. The rotary axes 4 and 5 are inclined to the front from bottom to top at angle of about 5° to 15° to the vertical. As shown in FIG. 1, the rotary axis 4 of the rake member 2 is ahead of the rotary axis 5 of the rake member 3. The rake members 2 and 3 have identical structures. In the illustrated embodiment, the rake member 3 is disposed completely behind a plane which extends transversely of the direction A and contains the center line of the rotary axis 4. The machine shown in the Figures operates as a side-delivery rake, in which crop picked up by the rake member 2 is passed to the rake member 3 which deposits the crop on the outboard side of the rake member 3 in the form of a swath.

The frame 1 of the machine comprises a trestle 6 in the form of an inverted U, as viewed in the direction A. Fastening points 7 are provided near the lower ends of the limbs of the U-shaped trestle for hitching the machine to the lower lifting arms of a three-point lifting device of a tractor. A fastening point 8 is provided near the upper point of the trestle 6 for connecting the machine to the top lifting arm of the three-point lifting device. A drawbar 9 is rigidly secured to the trestle 6 and extends as viewed on plan, at right angles to a plane to which the trestle 6 is parallel. The drawbar 9 thus extends substantially parallel to the direction A. The drawbar 9 is symmetrical about a vertical longitudinal central plane of the trestle 6 and to the central vertical plane of the tractor. The drawbar 9 extends rearwardly from the trestle 6 and has, at its rear end, a fork 10 in which is journalled a pivotal shaft 11 which occupies a fixed position relative to the trestle 6. A frame beam 12 rigidly interconnects bearings which support the rake members 2 and 3 for rotation about the rotary axes 4 and 5. This beam 12 is mounted for pivotable movement about the pivotal shaft 11 by supports 13 which are mounted on the pivotal shaft 11 and are rigidly secured to the beam 12. The supports 13 are situated approximately midway along the length of the frame beam 12 and, as viewed on plan, the pivotal shaft 11 is a very short distance in front of the frame beam 12 so that the pivotal shaft 11 is situated substantially in the middle of the region between the rotary axes 4 and 5.

Figure 2:
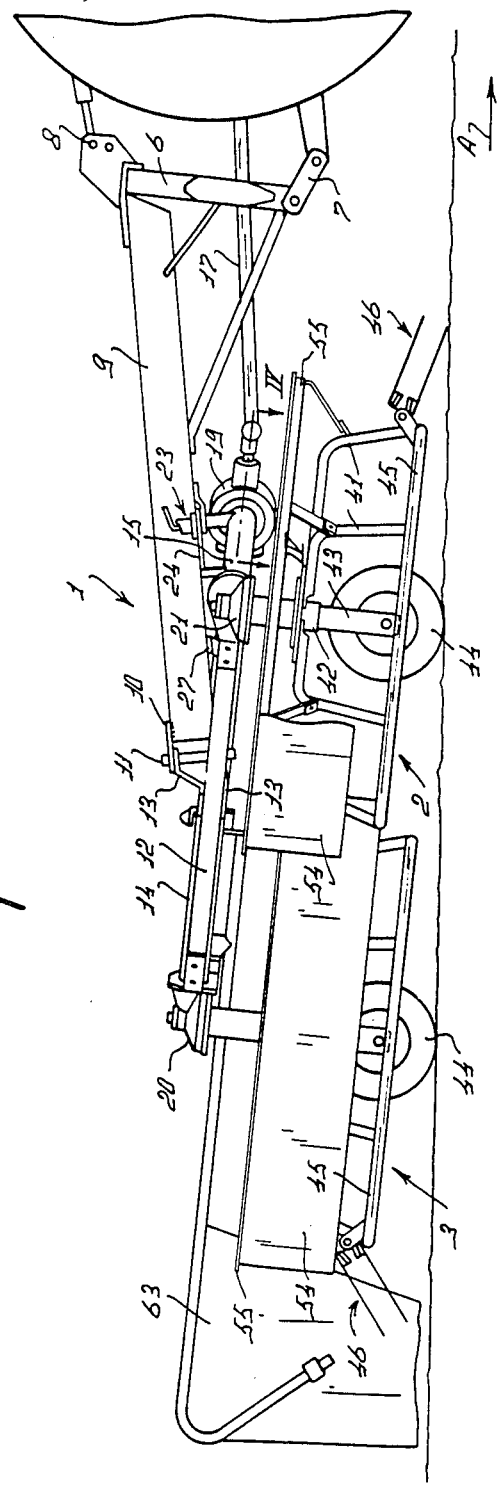
FIG. 2 is a side view of the machine of FIG. 1.

As shown in FIG. 2, the pivotal shaft 11 extends upwardly but is inclined to the rear from bottom to top. Its center line lies in a vertical plane extending in the direction A. As viewed from the side, (FIG. 2) the angle between the rearwardly inclined center line of the pivotal shaft 11 and the vertical, in the working position shown in FIG. 2, is about 2° to 10° (depending on the mass distribution of the machine parts) and in this embodiment it is about 2° to 7°, preferably about 5°.

The bearings in which the rake members are supported are rigidly interconnected not only by the frame beam 12 but also by two tubular frame beams 14 and 15 disposed in front of a plane containing the rotary axes 4 and 5. The frame beam 14 extends forwardly from the bearing of the rear rake member 3 in a direction slightly inclined towards the front rake wheel 2. The frame beam 15 extends almost laterally from the bearing of the front rake wheel 2 towards the front end of the frame beam 14. As shown in the plan view of FIG. 1, the center lines of the frame beams 14 and 15 are at 90° to one another. The point of intersection of the center lines of the beams 14 and 15 and the rotary axes 4 and 5, as viewed on plan, lie at the corners of a right-angled triangle. The paths described by the tips of the tines of the rake members 2 and 3 touch or almost touch each other (but do not overlap), and the point of intersection of the center lines of the frame beams 14 and 15 lies approximately on a common tangent 16 at the front of the paths described by the tine tips of the two rake members 2 and 3. Tangent 16 is parallel to a plane containing rotary axes 4 and 5, which plane, in turn, is inclined at a rearwardly opening angle 68 of about 50° to a vertical plane extending in direction A of the implement's operative travel as seen in FIG. 1.

The tubular frame beams 14 and 15 serve not only to support the rake members but also to support drive means for the rake members 4 and 5. As shown in FIG. 1, the direction in which the frame beam 14 extends differs only slightly from that in which an auxiliary shaft 17 extends. The shaft 17 connects a power take-off shaft of the tractor to an input shaft 18 of a drive casing 19 disposed at the junction between the frame beams 14 and 15. Drive shafts extend through the frame beams 14 and 15 from the drive casing 19 towards gear boxes 20 and 21 which are situated near the bearings supporting the rake members 3 and 2 respectively. The parts 12, 14, 15, 19 constitute a sub-frame which is pivotable about the pivotal shaft 11 with respect to the further frame 6,9.

In order to perform the function of crop-displacing members (in this case as side delivery rake members, but this also applies to rake members rotating in opposite senses in hay tedders) it is important for the rake members, as viewed on plan, to be disposed symmetrically about a vertical plane extending in the direction A and containing a point of the center line of the rotary axis. It directly follows that the entire rotary axis has to lie in this plane as is indicated above for the present embodiment. When the rake members are wholly or partly disposed one behind the other as in the present embodiment and when for structural reasons the rake members are to be driven about forwardly inclined rotary axes at angles of 90°, it follows that when the rake members are driven from a single, central point (the input shaft 18) the drive 20 of the hindmost rake member 3 will be at a higher level above the ground than the drive 21 of the front rake member 2 when the machine is in the working position. FIG. 2 shows that the frame beam 14 and the frame beam 15 are slightly inclined downwardly towards the drive casing 19 away from the drives 20 and 21 respectively.

The center of gravity 22 of the assembly comprising the rake members 2 and 3 and the frame interconnecting the rake members (i.e. the frame beams 12, 14, 15 and the drive casing 19) is spaced from the rearwardly inclined pivotal shaft 11, when the machine is in the working position. In this embodiment the center of gravity 22 is located ahead of the pivotal shaft 11. In other words the center of gravity 22 is located at a distance from the lowermost point of a circle in a plane at right angles to the center line of the pivotal shaft, going through the center of gravity and having in its center the point of intersection of the center line of the pivotal shaft with said plane.

Figure 8:
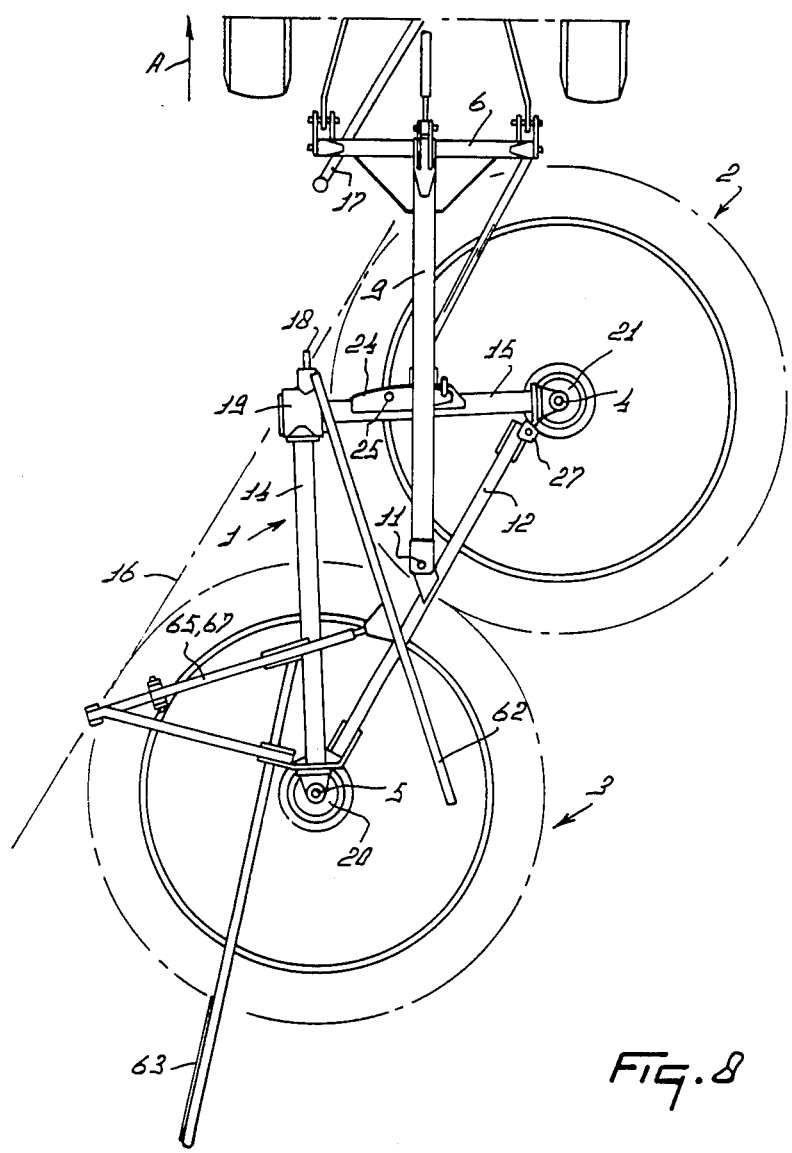
FIG. 8 is a plan view schematically representing a transport position of the machine.
Figure 9:
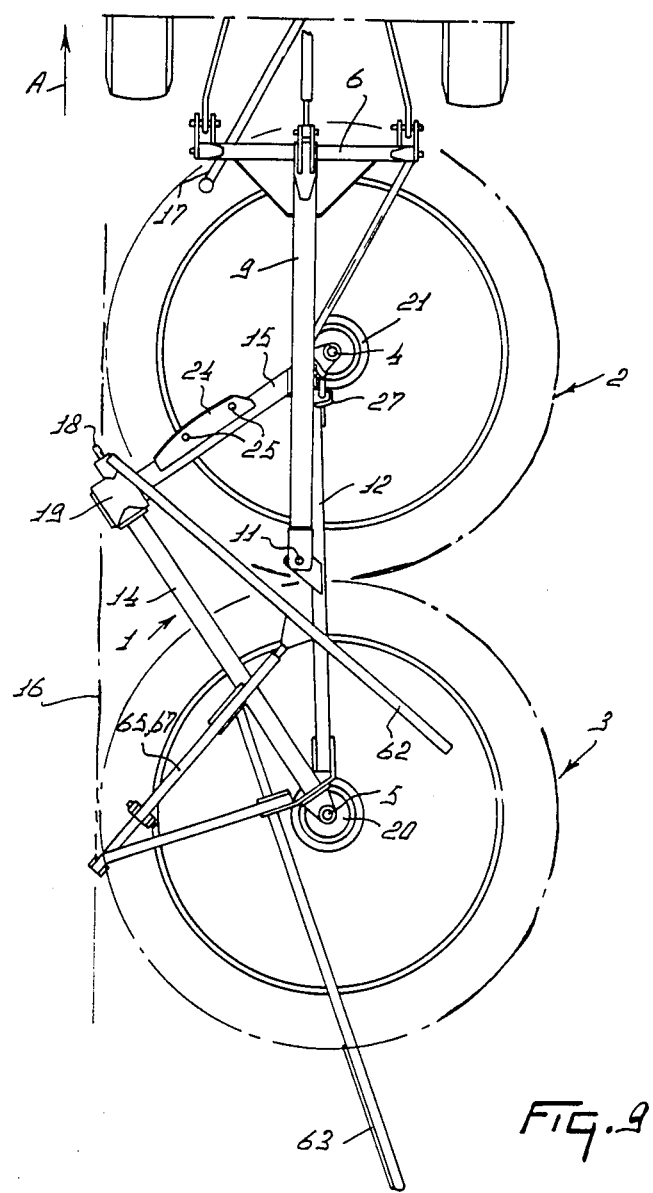
FIG. 9 is a plan view schematically representing an alternative transport position of the machine.

From the working position of the machine shown in FIG. 1, the assembly comprising the parts 2, 3, 12, 14, 15, 19, 20 and 21 is pivotable as a unit about the pivotal shaft 11 and so can be turned from the working position shown in FIG. 1 into transport positions as shown in FIGS. 8 and 9. For this purpose a locking device 23 (FIG. 3) is provided on the top of the frame beam 15 and on the underside of the drawbar 9 in the region of the frame beam 15 where during said change-over of the machine the drawbar 9 located above the frame beams 14, 15 moves over the frame beam 15. A locking plate 24 (FIGS. 1 and 3) is welded to the top of the frame beam 15. The plate 24 has two spaced holes 25. A locking pin 26 can be passed through either of the holes 25, this locking pin 26 being mounted on one side of the drawbar 9 in a manner which permits it to slide upwards and downwards. The hole 25 nearest the rotary axis 4 serves for locking the machine in the transport position shown in FIG. 8, in which the overall width of the machine (as viewed in the direction A) is considerably reduced with regard to the legal provisions for road transport. For the alternative transport position shown in FIG. 9, the end of the frame beam 12 nearer the gear box 21 is provided with a lug 27 having a hole 28 through which the locking pin 26 can be passed to secure the machine in the latter transport position. The surface of the locking plate 24 is, of course, at right angles to the direction of the pivotal shaft 11.

A freely projecting supporting plate 29 is rigidly secured to the underside of the drawbar 9 near the region where the holder of the locking pin 26 is secured to the drawbar 9 (FIG. 3). The free end of the plate 29 farther from the drawbar 9 is just in engagement with the underside of that part of the locking plate 24 which is at right angles to the pivotal shaft 11. Together with the locking plate 24 this supporting plate 29 forms a slidable support which, in any position of the machine, causes the assembly comprising the parts 2, 3, 12, 14, 15, 19, which is pivotable about the pivotal shaft 11, to bear directly on the drawbar 9 so that the pivotal shaft 11 is protected against bending due to articulation forces, acceleration forces and forces produced and transferred by the tines as a result of engagement with crop or the ground. This relief is obtained both in the working position and in the transport position when travelling over uneven land or on an uneven road and during change-over of the machine from the working to the transport position. Since the supporting plate 29 is some distance from the pivotal shaft 11 the latter can be relatively light and freely journalled, and effective relief from forces is obtained without hindering adjustment of the machine in any way.

The drive in the drive casing 19 is shown in detail in FIG. 4. The input shaft 18 is journalled in the drive casing 19 near the tangent 16, the centerline of the shaft 18 being at a very small angle to that of the auxiliary shaft 17. The shaft 18 has at its end inside the casing 19 a gear wheel 30, which is in mesh with a gear wheel 31 on a drive shaft 32, which is coaxial with the tubular frame beam 15. The drive shaft 32 is extended on the side of the gear wheel 31 away from the gear box 21 to a part of the casing 19 in which the shaft 32 is journalled. At this end the drive shaft 32 has a gear wheel 33, which is in mesh with a gear wheel 34 fastened to a drive shaft 35, which is coaxial with the hollow frame beam 14. The center lines of the drive shafts 32 and 35 intersect one another and, as stated above, they are at right angles to each other and to the rotary axis 4 and 5 respectively. The center lines of the shafts 32 and 35 intersect the rotary axes 4 and 5 respectively. The center line of the input shaft 18 and of the driving shaft 35 are slightly off-set relatively to one another in the embodiment of FIG. 4, but they are practically in line with one another.

In the proportioning of the drive casing 19 shown in FIG. 4, the drive shafts 32 and 35 are driven at a speed of about 245 rev/min when the input shaft 18 is driven by the power take-off shaft of the tractor at a speed of 540 rev/min. In the gear boxes 20 and 21 the speeds of rotation of the drive shafts 32 and 35 are reduced to about 111 rev/min. (equal to the speed of rotation of the rake members 2 and 3). Since during operation the shafts 32 and 35 rotate at a higher rotary speed than the rake members, the torque is relatively low. The dimensions of the shafts 32 and 35, of the gear wheels 31, 33, 34 and 37 and the dimensions of the frame beams 14, 15 and of the casing 19 may be relatively small.

The drive in the gear boxes 20 and 21 is illustrated in FIG. 5 (the gear box 21 is shown, but the drive in the gear box 20 is the same). The gear box 21 has a shaft 36, which is rigidly secured with respect to the housing of the gear box 21 and with respect to the frame beam 15. The center line of the shaft 36 coincides with the rotary axis 4 of the rake member, in this case the rake member 2. The drive shaft 32 is provided with a gear wheel 37 which is situated inside the housing of the gear box 21 and is in mesh with a gear wheel 38 mounted rotatably on the shaft 36. The center line of the drive shaft 32 is at right angles to the center line of the shaft 36 as described above. The gear wheel 38 is rigidly secured to a tubular hub 39, which is coaxial with the fixed shaft 36. The hub 39 has a flange 40 on the underside, to which flange 40 are fastened spokes 41 of the rake wheel. The shaft 36 projects beneath the flange 40 and the projecting part is surrounded by a sleeve 42, which is fixed in place with respect to the shaft 36. At its lower end the sleeve 42 has a wheel carrier 43 carrying the rotary axle of a ground wheel 44 disposed below the rake member. In the working position of the machine the orientation of the rotary axis of the ground wheel 44 is, therefore, fixed with respect to the gear box 21 and the frame 1 (FIG. 2). The construction of the gear box 20 and the support for the ground wheel located below it are similar to those of the gear box 21 of FIG. 5 except that the vertical dimension of the hub 39 is larger for the reasons mentioned above.

The spokes 41 of each of the rake members extend outwardly away from the associated hub 39 and are downwardly bent over near the circumference of the carrying body of the rake wheel. The lower ends of these downwardly bent-over parts are rigidly secured to a circular, continuous rim 45 (FIG. 6), which is centered on the rotary axis of the rake member concerned. The top of the rim 45 is provided at regular intervals with groups of tines 46. Each group comprises two spring steel tines fastened to a tine carrier 47, by spring coils.

The tine carrier 47 is freely pivotable with respect to the carrying body of the rake member concerned about a pivotal shaft 48 disposed above the rim 45 and extending substantially tangentially with respect to a circle centered on the rotary axis of the rake member. The group of tines 46 and the part of the tine carrier 47, to which the group of tines is fastened, are disposed radially outwardly of the pivotal shaft 48. This part of the tine carrier 47 extends downwards to a position below the pivotal shaft 48 and is then directed towards the rotary axis of the rake member as is indicated by broken lines in FIG. 6. Upward movement of the end of the inwardly directed part of the tine carrier 47 nearer the rotary axis of the rake member is limited, when turning about the pivotal shaft 48, by a stop 49, which is fastened to one of two lugs 50 welded to the rim 45 for supporting the pivotal shaft 48. The group of tines 46 of FIG. 6 is situated near the lowermost point of the rim 45 during operation. From FIG. 6 it will be appreciated that the tip of the lower tine of the group rests on the ground or lies in the stubble on the field. The tines of the group 46 are directed outwardly with respect to the carrying body of the rake member and rearwardly with respect to the direction of rotation B.

The center of gravity of each group of tines 46 including its fastening means on the tine carrier and of the tine carrier 47 is designated in FIG. 6 by reference numeral 51. In the position shown in FIG. 6, which shows the group of tines fastened to the part of the rim nearest the ground, the center of gravity 51 is above a plane at right angles to the respective rotary axis 4 or 5 and containing the center line of the pivotal shaft 48. The result is that the centrifugal forces acting on the center of gravity 51 produce a torque about the pivotal axis 48 which urges the lowermost tine against the ground. When the group of tines shown in FIG. 6 has turned on through 180° i.e. to a position near the highest point of the rim 45 with respect to the ground, the group of tines 46 is able to turn further downwards about the pivotal shaft 48 to bring the center of gravity 51 into the plane containing the pivotal shaft 48 and extending at right angles to the rotary axis of the rake member. At the highest point of the path, the tines of the group 48 are directed farther downwardly as is shown in FIG. 2. This is furthermore possible because the distance from the ground is then greater and at this area the tip of the lowermost tine of the group is spaced above the ground. As the rake member turns farther in the direction of rotation B, the tip of the lowermost tine will approach the ground and eventually it will touch the ground at a place near reference numeral 52 (FIG. 1), after which it is compelled by the ground (against the centrifugal force urging the group of tines downwards) to turn upwards about the pivotal shaft 48 until the pivotal shaft 48 reaches its lowermost point above the ground. At this point the height of the center of gravity 51 above the plane containing the associated pivotal shaft 48 and extending at right angles to the rotary axis reaches its maximum value so that the tip of the lowermost tine of the group is most strongly pressed against the ground or into the stubble in the front region of the rake member. When the group of tines turns farther to the rear, the tip of the lowermost tine will leave the ground near the place designated by reference numeral 53 because at that point the center of gravity 51 will reach the plane containing the pivotal shaft 48 and extending at right angles to the rotary axis. In this position the group of tines is in its fully downwardly directed orientation and this position is maintained for the rear half of the tine path up to the point 52. The circumferential angle between the points 52 and 53 is about 180° and is symmetrical about a vertical plane containing the rotary axis concerned and extending in the direction A.

The stop 49 is disposed so that the inwardly directed part of the tine carrier 47 is very close to or just touches the stop in the rear part of the tine path, where the group of tines is directed most downwardly.

Each of the rake members has a flexible wall 54 (FIG. 2) which is substantially cylindrical and centered on the rotary axis concerned. Each wall 54 is made of canvas or a similar material and is suspended at the top from a support 55 held by the spokes 41. The dimensions are such that the free lower edge of the flexible wall 54 extends, during operation, just to the top of the upper turns of the groups of tines 46 as the tines rotate near the foremost point of their paths. During operation the flexible wall 54 is stretched by centrifugal force. The stretched wall 54 prevents crop from penetrating across the group of tines 46 into the rake member and at the same time it seves as a crop-displacing member, since frequently in the case of large amounts of crop displaced per unit time an excess of crop builds up which projects above the groups of tines and bears on the wall 54, and this crop is carried along together with the crop wound around the tines in the direction B.

FIGS. 6 and 7 show an alternative disposition of the ground wheels in which the ground wheel is nearer the path of the tines than in the arrangement of FIG. 2. The ground wheel 44 of FIG. 6 thus enhances as much as possible the ability of the tines to follow the unevennesses of the ground. For this purpose an arm 56 is rigidly secured to the sleeve 42, this arm 56 extending forwardly from the sleeve 42 in the direction A. A sleeve 57 is fastened to the front end of the arm 56. A pivotal shaft 58 is journalled in the sleeve 57 and a downwardly and rearwardly inclined wheel carrier 59 is fastened to the shaft 58. The lower end of the wheel carrier 59 is directed inwardly and carries the axle of the ground wheel 44. The center line of the sleeve 57 and the coinciding center line of the pivotal shaft 58 are substantially parallel to the rotary axis of the rake member. The pivotal shaft 58 is pivotable to a limited extent in the sleeve 57 so that the ground wheel 44 has a caster action adjusting itself parallel to the direction A. The pivotal shaft 58 is extended upwardly and projects above the sleeve 57. A rearwardly directed arm 60 is secured to the projecting top end of the pivotal shaft 58. A curved bar 61 is welded around the front part of the top of the sleeve 57 to surround the front of the sleeve 57. The bar 61 is bent upwards and sideways at the sides of the sleeve 57 (FIG. 7) in a manner such that the end parts of the bar 61 are symmetrical about the arm 56 and are at an angle of about 120° to each other. These free end parts of the bar 61 are in the plane in which the free end of the arm 60 moves when the ground wheel 44 pivots.

The dimensions are such that the ground wheel 44 is as near to the front of the rim 45 as possible, while remaining able to swing freely, for travelling through bends when the machine is not raised, without touching the rim 45 or the spokes 41. Even when the machine is driven backwards and the ground wheel 44 swings out, the stop formed by one of the free ends of the bar 61 prevents the ground wheel 44 from touching the rim 45. In this way the ground wheel 44 can be positioned as near as possible to the front half of the tine path and the caster action of the ground wheel can be maintained, enabling a relatively large deflection of the ground wheel without the ground wheel touching the rotating rim 45 or other parts of the rake member. This caster wheel construction can be used independently of other described characteristics of the machine. The machine is also provided with a swath board 62 (FIG. 1), which is parallel to the direction of movement A during operation and which deflects the crop laterally displaced by the rake members 2 and 3 into the direction of the swath to be formed at the side of the machine. The swath board 62 extends forwardly at least up to a position level with the front of the carrying body of the front rake member 2 and extends rearwardly to a position level with or behind the rotary axis 5 of the rear rake member 3.

A second swath board 63 is disposed behind the path described by the ends of the tines of the rear rake member 3. This board 63 is inclined towards the plane of the swath board 62 from front to rear. The swath board 62 is spaced from the outermost point of the tine path of the rake wheel 3. The rear point of the swath board 63 lies near a line which extends in the direction A and is tangential to or slightly outside the path of the tips of the tines of the rake member 3. The swath board 63 extends forwardly towards the tine path, but stops short of it.

The swath board 62 is mounted on a carrier 64 (FIG. 1), which extends for part of its length in a hollow carrier 65 in which it is axially slidable. It can be fixed in any one of a plurality of positions in order to determine the desired swath width. The carrier 65 is pivotable with respect to the frame 1 about a pivotal shaft 66 which extends approximately in the direction A and is mounted on a support rod 67 which is rigidly secured to the frame beam 14. During operation the carriers 64 and 65 and the support rod 67 are at right angles to the direction A. The pivotal shaft 66 is situated inside the path of the tines of the rear rake member 3 and its distance from this tine path is such that after tilting up the swath board 62 and the carriers 64 and 65 about the pivotal shaft 66 the front end of the swath board 62 is located just inside the tangent 16, as is apparent in the transport position shown in FIGS. 8 and 9. In the transport position, the swath board 63 lies between the tangent 16 and the parallel common tangent to the path described by the tine tips at the rear of the rake members 2 and 3. The swath board 63 can also be tilted up in a manner not shown so that, in the transport position, it also lies between these two tangents.

During operation the illustrated hay-making machine is hitched to a tractor as is shown in FIG. 1. Since the axis of the drawbar 9 approximately lies in the coincident central vertical longitudinal planes of the trestle 6 and the tractor, and since the pivotal shaft 11 is located approximately midway between the rotary axes 4 and 5, the rake members 2 and 3 appear substantially symmetrical with respect to the tractor, as viewed in the direction A. The auxiliary shaft 17 is connected to the power take-off shaft of the tractor and so drives the input shaft 18 of the drive casing 19. Since the angle between the center lines of the auxiliary shaft 17 and of the frame beam 14 is very small (about 0° to 10°) and the angle between the center lines of the auxiliary shaft 17 and of the power take-off shaft of the tractor has the same low value, cyclic bending moments in the universal joints in the auxiliary shaft 17 (the rear joint is near the input shaft 18) are very small so that the load imposed on the machine frame by the drive and hence the resultant reaction forces in the region of the pivotal shaft 11 and the locking pin 26 are also very small, which ensures quiet operation of the machine. Furthermore, because the frame beams 14 and 15 are at 90° to each other and are disposed ahead of the plane containing the rotary axes 4 and 5, the auxiliary shaft 17 is relatively short. If the input shaft 18 were to lie in the region between the rotary shafts 4 and 5, as is the case in known machines of this type, the auxiliary shaft would be very long, since the distance between the pivotal shaft 11 and the tractor is determined by the transport position shown in FIGS. 8 or 9 required to satisfy the legal provisions with respect to the maximum road transport width. The input shaft 18 drives the drive shaft 32 through the gear wheels 30 and 31. The drive shaft 32 drives the hub 39 of the rake member 2 in the direction of rotation B through the gear wheels 37 and 38 and in a similar manner the shaft 32 drives the rake member 3 through the gear wheels 33 and 34 and the drive shaft 35.

Crop picked up by the rake member 2 is released in the region between the rake members 2 and 3 and is picked up by the rake member 3. The crop is then delivered in the direction B by the rake member 3 to the side of this rake member 3 where the swath board 62 guides it along the swath board 63 to form a swath at the side of the machine.

The transfer of the crop from the rake member 2 to the rake member 3 takes place without crop portions being left between the two rake members behind the machine so that all crop is delivered in the swath. This very satisfactory transfer of crop from the rake member 2 to the rake member 3 is a result of the tine construction and tine connection described above and shown in FIG. 6. The crop is picked up by the rake member 2 at the point 52, where the lower tines first touch the ground when beginning a pass at the front part of the tine path. In the part of the path where the tines move towards the front the lower tines of the groups are forced against the ground to described above, the ground compelling the lower tines to move upwards with respect to the carrying body against the centrifugal forces acting at the center of gravity 51. The tips of the tines move across the stubble and pick up the crop lying between them. Near the point 53 the lower tines leave the ground and consequently in the region between the rake members 2 and 3 the crop can freely slip off the tines also under the influence of the braking and stripping effect of the stubble. Near the point 53 the tines of each group 46 move with respect to the carrying body of the rake member, under the influence of the centrifugal forces acting at the center of gravity 51, and turn about the pivotal shaft 48 to the rear. Owing to the momentum of the group of tines and the way they are mounted, the center of gravity 51 of each group of tines moves downwards across the plane containing the axis of the pivotal shaft 48 and extending at right angles to the rotary axis before reaching a state of equilibrium in which the center of gravity 51 lies in that plane, which state of equilibrium is reached near the rear of the rake member. Since the tines move across this plane, the inner part of the tine carrier 47 vigorously strikes the stop 49 so that the tines will vibrate relatively strongly. This vibration contributes to the release of the crop near the point 53, which release is already assisted, as stated above, by the fact that the tine tips have left the ground in the region of the point 53 and the fact that the crop is snatched from the lower tines by the stubble. The stops 49 also prevent the tines from turning downwards too far or for too long near or behind the point 53 respectively, since in this region the tines should lift free of the ground in order to discharge the crop.

The crop thus ejected is directly picked up by those tines of the rake member 3 which are directed towards the rake member 2 and are moving forwards in the region between the two rake members. In this region the lower tines of the rake member 3 are urged against the ground in the manner described above so that already at this area the crop ejected by the rake member 2 is picked up. The areas covered by the two rake members as the machine travels in the direction A largely overlap each other as is illustrated by the dimensions of the embodiment shown.

The distance between the rotary axes 4 and 5 is in this embodiment about 200 centimeters. The diameter of the path described by the tips of the tines of each of the rake members 2 and 3 is about 195 to 200 centimeters. The plane containing the rotary axes 4 and 5 is, as is shown in the plan view of FIG. 1, inclined at a rearwardly opening angle 68 (FIG. 1) of about 50° to a vertical plane extending in the direction A. The overall working width is about 352 centimeters. The overlap mentioned above between the areas covered by the two rake members is in this embodiment about 11 to 14% of the overall working width of the rake members with a diameter of the tine path of 195 centimeters or 200 centimeters.

It should furthermore be noted that the angle between the direction of a tine and a tangent to the carrying body of the rake member at the area of the tine junction is higly important for the transfer of crop from the rake member 2 to the rake member 3. In the embodiment shown this angle is about 35° for a tine near the front of the rake member. Consequently the tines trail at a significant angle with respect to the carrying body of the rake member so that release of crop can be assisted by the air resistance.

The presence of the frame beams 14 and 15 in front of the plane containing the rotary axes 4 and 5 and forming with the frame beam 12 a right-angled triangle, is important not only because it makes possible the use of a short auxiliary shaft 17 with a small angle between the auxiliary shaft 17 and the input shaft 18 and hence quiet operation of the machine, but also because it eases the change-over of the machine from the working position shown in FIG. 1 to the transport position shown in FIGS. 8 and 9.

The center of gravity 22 of the assembly comprising the frame beams 14 and 15, the driving casing 19, the gear boxes 20 and 21 and the rake members 2 and 3 is ahead of the axis of the pivotal shaft 11. As stated above, the axis of the pivotal shaft 11 lies in a vertical plane extending in the direction A and is inclined to the rear from bottom to top. When the whole machine is lifted (by means of the three-point lifting device of the tractor) from the working position shown in FIG. 2 to a height such that the ground wheels 44 have just left the ground (which will not significantly alter the inclination of the pivotal shaft 11), the entire pivotable assembly 2, 3, 12, 14, 15, 19, 20 and 21 will turn automatically when the locking pin 26 is removed from its hole 25 in the locking plate 24 and will move from the working position into the position shown in FIG. 8 or 9 auxiliary shaft 17 having first been disengaged from input shaft 18. This is because the center of gravity 22 tends to move towards the lowermost point of its path around the pivotal shaft 11. Consequently, after removal of the locking pin 26, the operator need not exert heavy forces in order to turn the pivotable part into the transport position, he merely has to arrest the automatic turn at the appropriate time and to insert the locking pin 26 into the hole 25 or 28 associated with the required transport position. In the position shown in FIG. 8 the overall transport width of the machine having the dimensions mentioned above is about three meters. Measured in the direction A, the length of the assembly of rake members 2 and 3 is reduced from about 324 centimeters in the working position to about 268 centimeters in the transport position of FIG. 8.

When the machine has to be changed over from the transport position of FIG. 8 or 9 into the working position of FIG. 1, it is lifted by means of the lifting device of the tractor to a height such that the orientation of the axis of the pivotal shaft 11 changes from rearwardly inclined to forwardly inclined. This change of orientation of the axis of the pivotal shaft 11 is directly due to the dimensions of the lifting devices commonly used on tractors. Since the pivotal shaft 11 now slopes to the front, the pivotable assembly will automatically turn back into the working position of FIG. 1, after removal of the locking pin 26, so that it is necessary only to insert the locking pin into the hole 25 or 28 associated with the working position for completing the adjustment of the machine. Auxiliary shaft 17 is then connected to input shaft 18.

FIG. 9 shows an alternative transport position in which the rotary axes 4 and 5 of the rake members 2 and 3 respectively are disposed directly one behind the other. In this transport position the width is smallest i.e. a transport width equal to the diameter of the rake members from tip to tip of the tines. In the example given above the transport width is about 200 centimeters as compared with a transport width of 300 centimeters in the position of FIG. 8. In order to obtain the transport position of FIG. 9 the inclination of the axis of the pivotal shaft 11 and the automatic movement of the center of gravity 22 about the pivotal shaft 11 are again used both to change from the working position to the transport position (pivotal shaft 11 inclined to the rear) and from the transport position to the working position (pivotal shaft 11 inclined to the front when the machine is lifted relatively high).

The fact that in the transport position of FIG. 9 the transport width is determined by the diameter of one of the two rake members and the turn takes place automatically towards this transport position is related to the disposition of the frame beams 14 and 15, which are at an angle of 90° to one another. It will be obvious that the angle at the drive casing 19 of the triangle 4, 5, 19 lies on the tangent 16 to the approximately contiguous tine paths of the rake members so that in the transport position the construction of the frame part 14, 15 does not project beyond the tangent 16. Consequently the automatic turn into the transport position caused by the position of the center of gravity 22 and ensuing from the disposition of the frame beams 14 and 15 is connected with the fact that the overall transport width of the machine is determined exclusively by the overall diameter of one of the rake members, since with this very construction the frame part 14, 15 determining the location of the center of gravity 22 is at the same time the cause of the fact that the frame part does not project beyond the tangent 16. However, the disposition of the frame beams 14 and 15 can also be used independently of the automatic turn about the pivotal shaft 11, in particular with respect to an advantageous disposition and structure of the auxiliary shaft 17 and an advantageous proportioning of the frame beams as a result of an intermediate speed of the drive for the working members. From FIG. 9 it is apparent that the tilted-up swath board 62 does not project beyond the tangential line 16. The tilted-up swath board 63 does not increase the transport length. By tilting up the swath boards 62 and 63, the center of gravity of the whole machine is displaced to the front.

The transport width of FIG. 9 is thus determined by the total diameter of one of the rake members (in this case 200 centimeters). This means that with a disposition of two rake members directly one behind the other it is possible to use larger rake members (having a diameter of 300 centimeters and hence a working width of about 440 centimeters, in which case three swaths can be simultaneously worked), without this increase in working width causing difficulties resulting from the legally allowed transport width. In the transport position of FIG. 9 it is also possible for the tines of the rake member 2 to extend below the trestle 6 and below the fastening points 7 for the lower arms of the lifting device.

With the above-mentioned dimensions of the machine the length of the machine, measured in the direction A, from the pins for fastening to the lower arms of the lifting device up to the rearmost point of the rake member 3 is about 384 centimeters in the transport position of FIG. 8; the corresponding length in the transport position of FIG. 9 is about 405 centimeters (with the swath board 63 tilted over).

As compared with the transport position of FIG. 8 the center of gravity 22 in the position of FIG. 9 has moved hardly at all to the rear in a direction parallel to the direction A so that the distance between the center of gravity and the trestle 6 is hardly increased at all.

It should be emphasized that the principle underlying the automatic turning from the working position of FIG. 1 into the transport position of FIG. 8 or 9 as a result of the position of the center of gravity 22 and of the inclined position of the pivotal shaft 11 is not limited to a side delivery rake as shown in FIG. 1, but also applies, for example, to two rake members rotating in opposite senses, in which the plane containing the rotary shafts is at right angles to the direction A. The automatic turn principle can, in general, be applied to agricultural machines, part of which has to be movable for whatever reason into two or more positions, while the machine is attachable to a three-point lifting device of a tractor.

Although various features of the machine described and illustrated in the drawings will be set forth in the following claims as inventive features, it should be appreciated that the invention is not necessary limited to these features and may encompasses all such features that have been disclosed either individually or in various combinations.

We claim:
1. An agricultural machine comprising:
a frame including means adapted for connection to a three-point lifting device of a tractor which are so constructed and arranged that said frame can be raised by said three-point lifting device;
a sub-assembly comprising a working member of the machine; and
connecting means connecting said sub-assembly to said frame for pivotal displacement between a working position and a transport position about an upwardly extending pivotal axis which, in the working position is inclined to the rear with respect to the intended direction of operative travel of the machine, from bottom of top;
the center of gravity of said sub-assembly, when in said working position, being spaced from said pivotal axis so that when the machine is lifted by a tractor's three-point lifting device it is displaceable by gravity from said working position to said transport position when the tractor and machine are supported by a substantially level surface.

2. An agricultural machine as claimed in claim 1, in which the center of gravity of said sub-assembly is spaced from the lowermost point of a circle centered on said pivotal axis and lying in a plane at right angles to said pivotal axis, the circle passing through the center of gravity of the sub-assembly.

3. An agricultural machine as claimed in claim 1, in which, in the working position, said center of gravity of said sub-assembly is situated ahead of said pivotal axis, with respect to the intended direction of operative travel.

4. An agricultural machine as claimed in claim 1, in which said pivotal axis occupies a fixed position with respect to a trestle connected to said frame, for connecting the machine to the three-point lifting device of a tractor.

5. An agricultural machine as claimed in claim 1, in which said pivotal axis lies in a vertical plane parallel to the intended direction of operative travel.

6. An agricultural machine as claimed in claim 1, further comprising releasable locking means for locking sub-assembly in said working position with respect to said frame, in which when said locking means is released and the machine is raised just above the ground, said sub-assembly automatically turns from said working position into said transport position.

7. An agricultural machine as claimed in claim 1, further comprising releasable locking means for locking said sub-assembly in said transport position with respect to said frame, in which, when said locking means is released and the machine is raised to a substantial height above the ground, said sub-assembly automatically turns from said transport position into said working position.

8. An agricultural machine as claimed in claim 1, in which said working member is one of at least two rake members which are adapted to rotate about upwardly directed rotary axes.

9. An agricultural machine as claimed in claim 8, in which the center of gravity of said sub-assembly, when in the working position, is situated in front of a plane containing said rotary axes.

10. An agricultural machine as claimed in claim 8, further comprising bearings defining said rotary axes, in which said sub-assembly comprises two frame beams which are at right angles to each other, each said beam being fastened near a bearing of said rake members.

11. An agricultural machine as claimed in claim 10, in which the center lines of said frame beams intersect each other.

12. An agricultural machine as claimed in claim 8, wherein said sub-assembly comprises frame beams for carrying said rake members and in which the center line of each of said frame beams intersects a respective one of said rotary axes.

13. An agricultural machine as claimed in claim 10, in which said sub-assembly comprises a frame beam intersecting said bearings.

14. An agricultural machine as claimed in claim 8, in which said pivotal axis is disposed substantially midway between said rotary axes.

15. An agricultural machine as claimed in claim 1, further comprising a drawbar connected to a three-point trestle, said sub-assembly being connected to said drawbar at said pivotal axis.

16. An agricultural machine as claimed in claim 15, in which said drawbar is rigidly secured to said trestle in a disposition which is symmetrical with respect to a vertical plane extending in the intended direction of operative travel.

17. An agricultural machine as claimed in claim 1, in which said frame is provided with a support which is spaced from said pivotal axis and is adapted to support said sub-assembly in the working position.

18. An agricultural machine as claimed in claim 17, in which said support is provided which is adapted to support the sub-assembly in the transport position.

19. An agricultural machine as claimed in claim 16, in which a support is adapted to suppport said sub-assembly during pivotal movement of said sub-assembly about said pivotal axis.

20. An agricultural machine as claimed in claim 8, in which a plane containing said rotary axes is inclined at a rearwardly opening angle of about 50° to a vertical plane extending in the intended direction of operative travel.

21. An agricultural machine as claimed in claim 8, in which each said rotary axis of said rake members lies in a vertical plane extending in the intended direction of operative travel, said axis of said rake members being inclined to the front from bottom to top.

22. An agricultural machine as claimed in claim 21, in which, in operation, said rake members are driven in the same direction of rotation as each other.

23. An agricultural machine as claimed in claim 8, in which said rake members comprise tines which are directed outwardly and rearwardly, with respect to the direction of rotation of the respective said rake members.

24. An agricultural machine as claimed in claim 23, in which at least some of said tines of each said rake member contact the ground, in operation, along substantially the entire front half of the tine path.

25. An agricultural machine as claimed in claim 8, further comprising ground wheels which, during operation, support the machines by said ground wheels being disposed beneath said rake members near the front part of the tine path of the respective said rake member, said ground wheels being adapted to swivel with a caster action.

26. An agricultural machine as claimed in claim 8, in which, in said transport position, the rotary axes of the rake members are disposed directly one behind the other.

27. An agricultural machine as claimed in claim 8, in which the transport width of the machine is exclusively determined by the overall diameter of one of said rake members.

28. An agricultural machine as claimed in claim 26, further comprising frame members of said sub-assembly which, in the transport position, are disposed within the transport width.

29. An agricultural machine as claimed in claim 8, further comprising
an output shaft drivingly connected to said rake members;
an input shaft drivingly connected to said output shaft; and
an auxiliary shaft drivingly connected to said input shaft and adapted for connection to a power take-off shaft of a tractor,
said output shaft being substantially in line with said auxiliary shaft in operation.

30. An agricultural machine as claimed in claim 8, further comprising an input shaft drivingly connected to said rake members, said input shaft being situated approximately in the region of a common tangent to the paths described by the tips of said tines of said rake members, said tangent being disposed in front of the rake members.

31. An agricultural machine as claimed in claim 9, comprising frame beams which support drive shafts for said rake members.

32. An agricultural machine as claimed in claim 31, further comprising an input shaft for said drive shafts in which said frame beams support said input shaft at a junction of said frame beams.

33. An agricultural machine as claimed in claim 31, in which each of said drive shafts is at right angles to the rotary axis of the respective said rake members.

34. An agricultural machine comprising:
a frame adapted for connection to a three-point lifting device of a tractor; a sub-assembly comprising a working member of the machine; and connecting means connecting said sub-assembly to said frame for pivotal displacement between a working position and a transport position about an upwardly extending pivotal axis which, in the working position, is inclined from bottom to top to the rear with respect to the intended direction of operative travel of the machine; said sub-assembly's center of gravity when in said working position being spaced from said pivotal axis, said center of gravity further being in a plane at right angles to said pivotal axis and on a circle in said plane centered on said pivotal axis at a location which is spaced away from the lowest point on said circle.

35. An agricultural machine comprising:
a frame adapted for connection to a three-point lifting device of a tractor; a sub-assembly comprising a working member; and connecting means connecting said sub-assembly to said frame for pivotal displacement between a working position and a transport position about an upwardly extending pivotal axis which, in the working position, is inclined from bottom to top to the rear, with respect to the intended direction of operative travel of the machine; the center of gravity of said sub-assembly, when in said working position, being spaced from and ahead of said pivotal axis with respect to the machine's intended direction of operative travel.

36. An agricultural implement which comprises:
a frame including means for connection to a tractor's three-point lifting device; a sub-assembly comprising a working member; and pivot means pivotably supporting said sub-assembly from said frame so it can be selectively turned about the pivot axis of said pivot means, said pivot axis being inclined upwardly in a direction away from said connection means when said sub-assembly is in a working position; said sub-assembly having a center of gravity spaced laterally, considered from said connection means, from said pivot axis so that when the implement is raised to a first level above a horizontal surface supporting the tractor by the tractor's three-point lifting device, said pivot axis is still inclined upwardly in a direction away from said connection means and said sub-assembly is urged by gravity to pivot from a first position to a second level about said pivot axis, and when said implement is raised to a second level so that said pivot axis is inclined upwardly in a direction towards said connection means, said sub-assembly is urged by gravity to pivot from said second position to said first position.

37. An agricultural implement as claimed in claim 36 wherein said first position is a working position and said second position is a transport position.

* * * * *